United States Patent [19]

Gillman

[11] Patent Number: 4,468,779
[45] Date of Patent: Aug. 28, 1984

[54] ELECTRODE ASSEMBLY FOR MELTING GLASS

[75] Inventor: Dale C. Gillman, Kent, Wash.

[73] Assignee: CRI Engineering, Inc., Tukwila, Wash.

[21] Appl. No.: 446,848

[22] Filed: Dec. 6, 1982

[51] Int. Cl.³ .......................... C03B 5/027; H05B 3/03
[52] U.S. Cl. ....................................................... 373/36
[58] Field of Search ...................... 373/36, 37, 38, 120, 373/134, 117, 113

[56] References Cited

U.S. PATENT DOCUMENTS

| | | | |
|---|---|---|---|
| 1,222,243 | 4/1917 | Peiler . | |
| 1,897,973 | 2/1933 | Wadman . | |
| 2,697,125 | 12/1954 | Douglas | 373/38 |
| 2,781,411 | 2/1957 | Geffcken et al. | 13/31 |
| 2,843,644 | 7/1958 | Hann | 373/36 |
| 3,198,619 | 8/1965 | Nuzum | 65/346 |
| 3,539,691 | 11/1970 | Lucek | 373/36 |
| 4,069,032 | 1/1978 | Brax | 65/337 |
| 4,097,259 | 6/1978 | Brax | 65/327 |

Primary Examiner—Roy N. Envall, Jr.
Attorney, Agent, or Firm—Seidel, Gonda & Goldhammer

[57] ABSTRACT

An electrode assembly for melting glass includes a hollow casing having a holder connected to one end thereof. A water cooled conductor in said casing is connected to an electrode which is also connected to said holder. A limit stop is provided on a casing and adapted to contact refractory of a furnace to limit the extent to which the electrode assembly may enter the furnace in a downward direction while permitting the electrode to be elevated for inspection.

12 Claims, 4 Drawing Figures

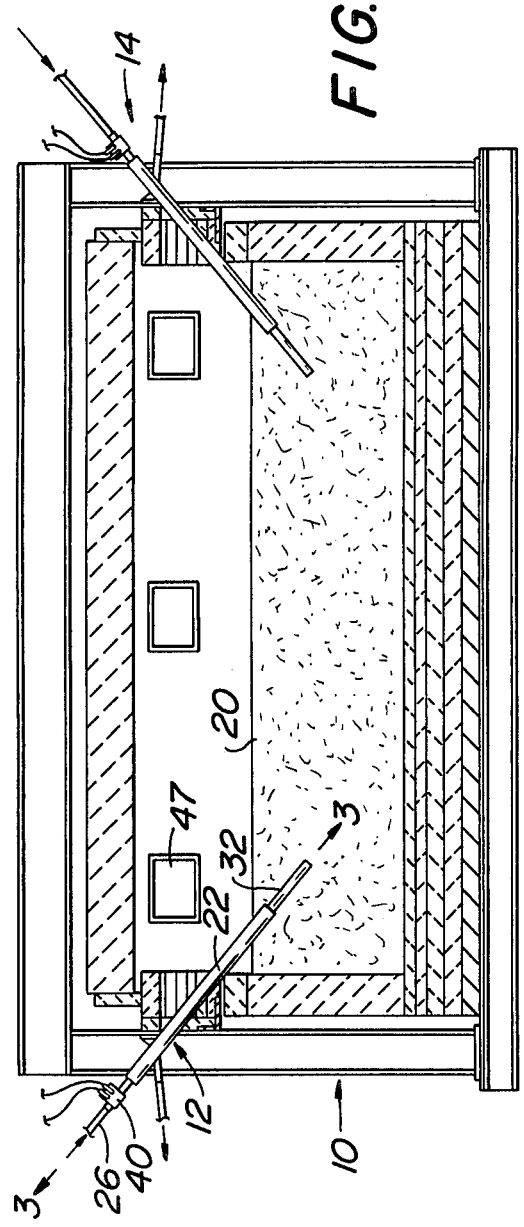
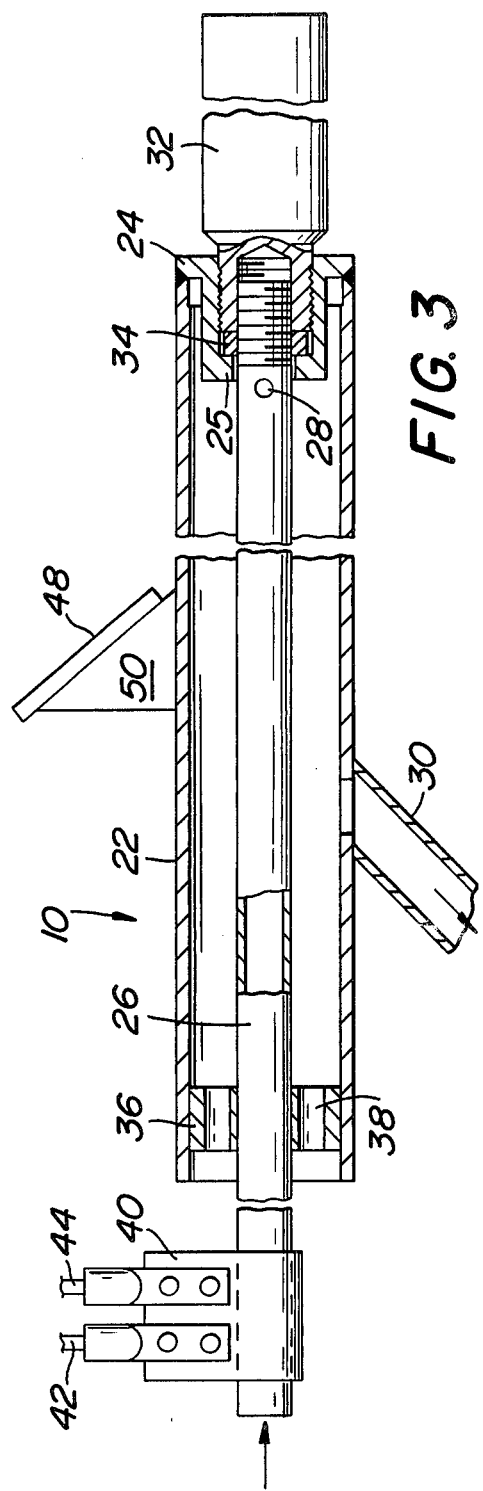

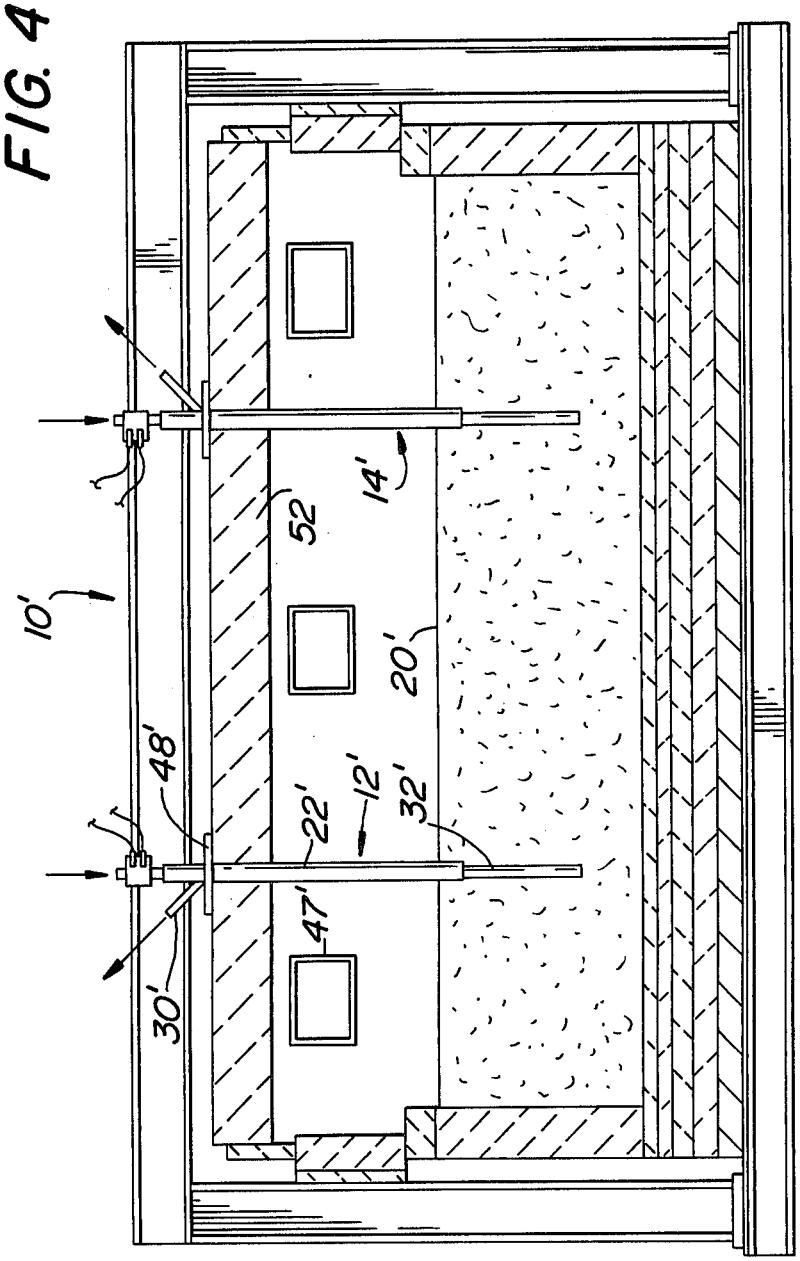

ELECTRODE ASSEMBLY FOR MELTING GLASS

SUMMARY OF THE INVENTION

The present invention is directed to an electrode assembly for melting glass and includes a hollow casing having an inner end and an outer end. A holder is connected to the inner end of the casing. A water cooled conductor is disposed in said casing and extends out the outer end of the casing. One end of an electrode is removably connected to each of the holder and the conductor. A means is provided for draining water from the casing. A limit stop means is provided on the casing and adapted to contact refractory of a furnace to limit the extent to which the electrode enters the furnace in a downward direction. The electrode is supported by contact between the limit stop means and the furnace refractory while permitting the electrode to be elevated for inspection.

It is an object of the present invention to provide a novel electrode assembly wherein the electrode may be rapidly inspected for wear and may be rapidly replaced in the event of excessive wear or failure.

Other objects and advantages of the present invention will appear hereinafter.

For the purpose of illustrating the invention, there is shown in the drawings a form which is presently preferred; it being understood, however, that this invention is not limited to the precise arrangements and instrumentalities shown.

FIG. 1 is a vertical sectional view through a glass melting furnace with a plurality of the electrode assemblies extending through a breast wall of the furnace.

FIG. 3 is a sectional view taken along the line 3—3 in FIG. 1.

FIG. 4 is a view similar to FIG. 1 but showing the electrode assembly supported by the crown of the furnace.

DETAILED DESCRIPTION

Figure 2:
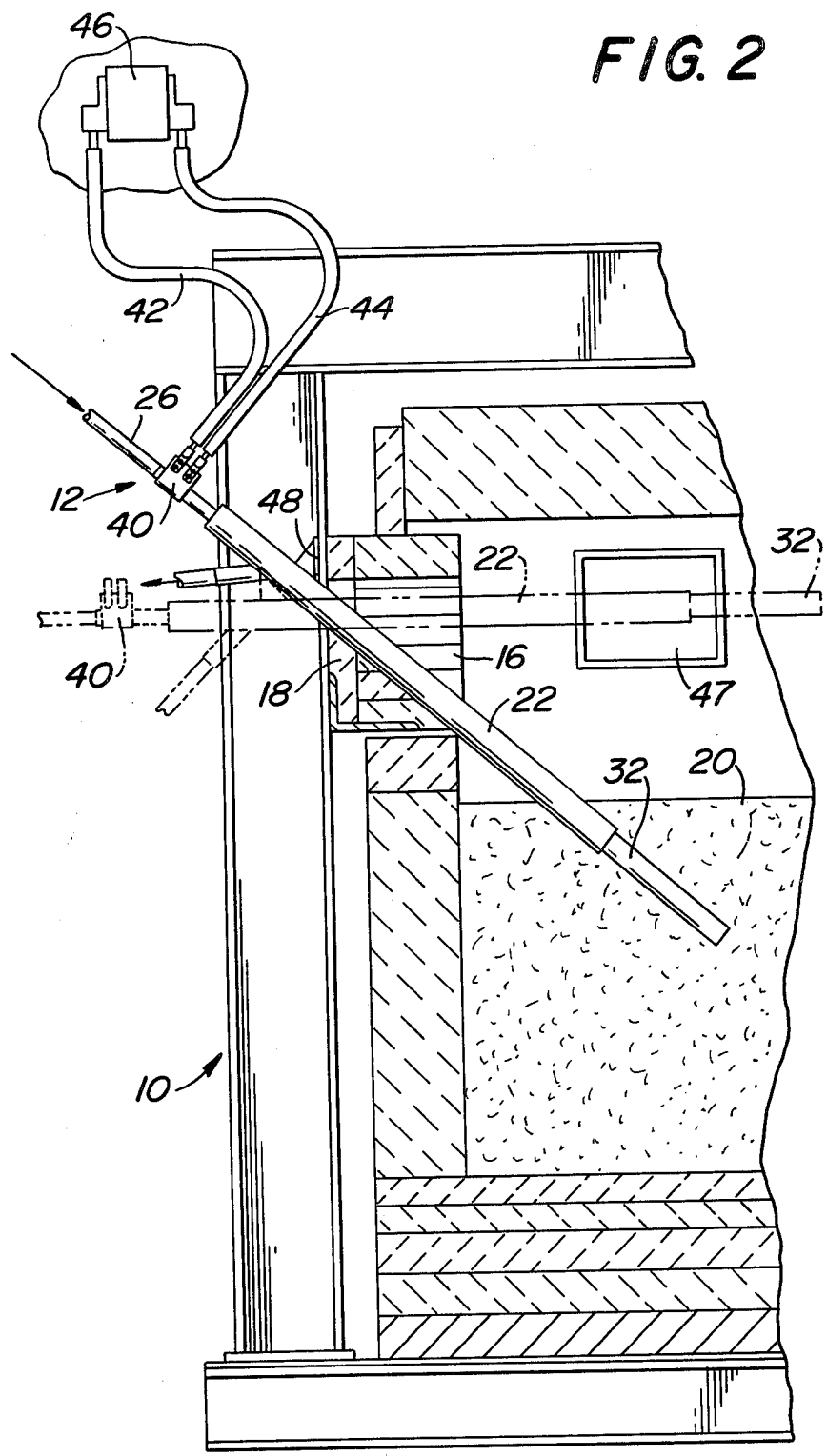
FIG. 2 is an enlarged illustration of the left hand end of FIG. 1.

Referring to the drawing in detail, wherein like numerals indicate like elements, there is shown a glass melting furnace designated generally as 10. A plurality of sets of electrode assemblies 12 and 14 extend through the breast walls of the furnace 10. The electrode assemblies are identical. Hence, only electrode assembly 12 will be described in detail.

As shown more clearly in FIG. 2, the electrode assembly 12 extends through a hole 16 in the breast wall 18 with the electrode extending into the molten glass 20. The assembly 12 extends downwardly through the hole 16 which is in the form of a truncated cone or frustrum of a pyramid.

Referring to FIG. 3, the assembly 12 includes a casing 22 preferably made from a material such as stainless steel. A holder 24 preferably made from a material such as stainless steel is fixedly secured to the inner end of the casing 22. A hollow electrical conductor 26 preferably made of copper or cooper alloy is disposed within the casing 22 and extends out of the left hand end or outer end of the casing 22 in FIG. 3. The OD of conductor 26 is substantially less than the ID of casing 22. Water or other liquid coolant introduced through the hollow conductor 26 from the left hand end thereof in FIG. 3 exits through the holes 28 into the casing 22 and discharges through the drain 30. Drain 30 is angled slightly below the horizontal when installed as shown in FIG. 2.

An electrode 32, made from a material such as molybdenum has an immersion end extending into the molten glass 20. The other end of electrode 32 has a reduced diameter portion threaded to the holder 24 and also threaded to the conductor 26. An electrically conductive seal 34, made from a material such as copper, extends between an inwardly directed flange 25 on the holder 24 and an end face of the electrode 32. An electrically insulating spacer 36 extends between the conductor 26 and the inner surface of the casing 22 adjacent its outer end. Spacer 36 is preferably made from an insulating material such as micarta. Spacer 36 is preferably provided with one or more axial holes 38 which facilitate the exit of any steam generated within the casing 22.

A clamp 40 is attached to the exposed outer end of the conductor 26. Clamp 40 is coupled to a primary bus bar by flexible cables 42 and 44. There is sufficient slack in the cables 42 and 44 to facilitate manually moving the assembly 12 from the solid line position in FIG. 2 to the phantom position in FIG. 2 to thereby facilitate inspection of the electrode 32 via one of the windows 47.

A bracket 48 is attached to the casing 22 by way of an angled plate 50. Bracket 48 contacts refractory in the breast wall 18 to thereby limit the downward extent to which the assembly 12 enters the furnace 10. The bracket 48 does not interfere with the ability of moving the electrode 32 out of the molten glass 20 so that it may be inspected.

In FIG. 4 there is illustrated a furnace 10' with electrode assemblies 12' and 14' supported by the crown 52. The embodiment in FIG. 4 is the same as that described above except as follows wherein corresponding primed numerals are used.

Assembly 12' is the same as assembly 12 except that bracket 48' is annular and fixedly secured directly to casing 22'. Also, drain 30' is angled upwardly at a location above the bracket 48'.

An assembly in accordance with each embodiment of the present invention facilitates disconnection of power and changing the electrode within 10 minutes. This is a substantial advance over the prior art. Each embodiment is gravity biased in a downward direction and the electrode can be elevated out of the molten glass for inspection without disconnecting power.

The following sets forth some of the advantages of the present invention. The electrode assembly results in lower side wall temperatures which extends the life of the furnace and improves thermal efficiency in melting the glass. Glass temperature exiting the furnace is lower than that of prior devices at comparable pull rates. A simple speedy means is provided to visually observe the electrode for condition and wear. It is unexpected that the glass temperature entering the riser was lower with increased tonnage.

The present invention may be embodied in other specific forms without departing from the spirit or essential attributes thereof and, accordingly, reference should be made to the appended claims, rather than to the foregoing specification, as indicating the scope of the invention.

I claim:

1. An electrode assembly for melting glass comprising a hollow casing having an inner end and an outer end, a holder connected to the inner end of said casing, a hollow liquid cooled electrical conductor having one end in said casing and extending out the other end of said casing, an electrode having one end removably connected to each of said holder and conductor, means connected to said casing between the ends thereof for draining a liquid coolant from said casing, and limit stop means on the casing adapted to contact refractory of a furnace and limit the extent to which the electrode can enter a furnace in a downward direction so that the electrode is supported by contact between the limit stop means and the furnace refractory while permitting the electrode to be elevated to a position within a furnace for inspection and without shutting off power to said conductor.

2. An assembly in accordance with claim 1 including an electrically non-conductive spacer between said casing and said conductor, said spacer having steam vent holes.

3. An assembly in accordance with claim 1 wherein the outer periphery of said electrode is threaded to the inner periphery of said holder, said conductor being threaded to a blind hole in said electrode, and a seal between said holder and said electrode.

4. An electrode assembly in accordance with claim 1 wherein the interior of said hollow conductor communicates by way of a hole in the conductor with the interior of the casing, the OD of the conductor being substantially less than the ID of the casing.

5. An assembly in accordance with claim 1 wherein said limit stop means and said drain are diametrically opposite one another on the outer periphery of said casing.

6. An assembly in accordance with claim 1 wherein said electrode is cylindrical and has a diameter not greater than the diameter of said casing, said electrode being coaxial with said conductor.

7. An electrode assembly for melting glass comprising a hollow metal casing, an electrical conductor coaxial within said casing, an electrode having coaxial inner and outer sets of threads, the electrode outer threads being coupled to said holder, the electrode inner threads being coupled to threads on said conductor, a seal of electrically conductive material between said holder and said electrode, said seal surrounding said electrode, a spacer within said casing, said spacer being of electrically non-conductive material having a central hole through which said electrode extends, a bracket attached to the outer periphery of said casing, said bracket being adapted to contact refractory of a furnace to limit the extent to which the electrode enters the furnace in a downward direction without interfering with the ability of the electrode to be elevated for inspection.

8. A glass melting furnace having a plurality of electrode assemblies for melting glass in said furnace, each electrode assembly including an upright hollow metal casing having an upper end and a lower end, a holder connected to the lower end of said casing, an electrical conductor having one end in said casing and extending out the upper end of the casing, one end of an electrode being removably connected to each of said holder and conductor, and limit stop means on the casing gravity biased into contacting refractory of a wall of the furnace to limit the extent to which the electrode can enter the furnace in a downward direction so that the electrode is below the level of molten glass and supported by contact between the limit stop means and the furnace refractory while permitting the electrode to be elevated to a position in the furnace above said level of molten glass for inspection.

9. A furnace in accordance with claim 8 wherein said furnace wall is a breast wall.

10. A furnace in accordance with claim 8 wherein said furnace wall is a crown.

11. A furnace in accordance with claim 8 wherein said conductor is hollow and has a hole adjacent said holder which communicates the interior of the electrode with the interior of said casing, and a liquid coolant drain connected to said casing.

12. A furnace in accordance with claim 8 wherein the furnace wall has an opening for receiving the electrode assembly, said opening having transverse dimensions on the inner surface of the furnace wall which are greater than the transverse dimensions of the opening at the outer surface of the wall to facilitate pivoting said assembly for said inspection.

* * * * *